United States Patent [19]

Ishikawa et al.

[11] Patent Number: 4,803,337
[45] Date of Patent: Feb. 7, 1989

[54] METHOD FOR PRODUCING A LIGHT TRANSMITTING FILTER

[75] Inventors: Reiji Ishikawa; Tomohiro Kimura, both of Tokyo, Japan

[73] Assignee: Sony Corporation, Tokyo, Japan

[21] Appl. No.: 125,828

[22] Filed: Nov. 25, 1987

Related U.S. Application Data

[63] Continuation of Ser. No. 673,728, Nov. 21, 1984, abandoned.

[30] Foreign Application Priority Data

Nov. 28, 1983 [JP] Japan .................... 58-223894

[51] Int. Cl.$^4$ .............................................. B23K 26/00
[52] U.S. Cl. ...................... 219/121.85; 219/121.71; 219/121.61; 350/1.6
[58] Field of Search ............... 219/121 LL, 121 LK, 219/121, LN, 121 LM, 121 EM, 121 LA; 350/1.6, 1.7; 346/76 L

[56] References Cited

U.S. PATENT DOCUMENTS

| | | | |
|---|---|---|---|
| 3,596,045 | 7/1971 | Steigerwald et al. | 219/121 LL |
| 3,622,742 | 11/1971 | Cohen et al. | 219/121 LL |
| 4,028,523 | 6/1977 | Anderl et al. | 219/121 LM |
| 4,087,281 | 5/1978 | Toda et al. | 219/121 LM |
| 4,131,782 | 12/1978 | Einstein et al. | 219/121 LL |
| 4,172,219 | 10/1979 | Deml et al. | 219/121 LM |
| 4,297,559 | 10/1981 | Whitman, III | 219/121 LL |
| 4,316,073 | 2/1982 | Lemelson | 219/121 LL |
| 4,386,145 | 5/1983 | Gilmour | 219/121 LL |
| 4,465,540 | 8/1984 | Albert | 350/1.6 |

Primary Examiner—M. H. Paschall
Attorney, Agent, or Firm—Hill, Van Santen, Steadman & Simpson

[57] ABSTRACT

A method for the preparation of an illuminance-correcting light transmitting filter employed in an exposure device adapted for the preparation of the phosphor screen of the color cathode ray tube. The laser light modulated with a light modulator is radiated to the surface of the filter base plate on which a thin layer of the recording material is previously formed. A pattern of through-holes of variable size or density is formed as the thin layer is vaporized so that the light transmitting filter may be prepared with high accuracy and in a shorter time. The laser light is modified with the light modulator, and the filter base plate is securely mounted to a movable stage, the movement of which in the X- and Y- directions is controlled under the commands of a computer unit.

9 Claims, 3 Drawing Sheets

METHOD FOR PRODUCING A LIGHT TRANSMITTING FILTER

This is a continuation of application Ser. No. 673,728, filed Nov. 21, 1984 now abandoned.

BACKGROUND OF THE INVENTION

1. Field of the Invention

This invention relates to a method of producing a light-transmitting filter used for illuminance correction purposes in an exposure device adapted for producing a phosphor screen of a cathode ray tube. More particularly, it relates to a method by means of which a light-transmitting filter presenting variable light transmittance in various portions of the filter and preset distribution characteristics of transmitted light may be produced accurately and in a short time.

2. Description of the Prior Art

On the phosphor screen of a color cathode ray tube, there are arranged an extremely large number of dots or stripes of the tricolor phosphors that emit red, blue and green lights when excited by an electron beam. In preparing the screen, a phosphor slurry is applied to the inner surface of the panel of a cathode ray tube. The slurry is exposed to a light beam by an exposure device making use of the light-transmitting filter and developed for producing a completed phosphor screen.

For producing the light transmitting filter used in the exposure device, there are known various methods, such as photographic or transcription method, and a method consisting in sequentially combining small pieces of different light transmittance. In the photographic or transcription method, a master pattern consisting of the reverse of the the light transmitting filter pattern to be produced is prepared by a plotter and transferred onto a photographic dry plate having a higher gamma value. Alternatively, the step of producing the master pattern is omitted and a pattern consisting of a combination of stripes of variable widths is formed on the photographic dry plate with a higher gamma value by exposing the dry plate to a light beam whose intensity is modulated by means of an interposed rotary plate. The pattern thus formed on the dry plate is developed and fixed. A glass plate coated with a photoresist layer is intimately applied to the photographic dry plate. After exposure, the carbon slurry is poured on the glass plate. The pattern is transferred to the carbon mass after development for providing the light transmitting filter having, the preset light transmittance characteristics. This prior-art method has the deficiency that a number of steps are required so that manufacture time can generally not be reduced. Moreover, it is not possible with the prior-art method to produce the light transmitting filter of higher accuracy because of the error caused during the steps of preparation of the master pattern, exposure of the photographic dry plate, development/fixing and transfer to and development of the carbon slurry.

There are also known methods of changing the light transmittance of the filter as by changing the stripe width or line width, or the method of changing the pitch or line width of the mesh pattern. However, with these known methods of changing the line widths, it is not possible to produce the filter with sufficient accuracy, or to avoid the problem of moire.

The recent tendency is towards using a high precision color cathode ray tube with an extremely narrow phosphor stripe interval pitch of 0.2 to 0.3 mm. Above all, a high degree of uniform whiteness is required of the high precision cathode ray tube employed in a broadcasting station for monitoring purposes. For this reason, a high-precision and high-fidelity control technique is required for the preparation of the high-precision color cathode ray tube, so that a high-precision light transmitting filter needs to be used in the exposure device. However, it is difficult with the above described conventional methods to prepare the high precision and high fidelity light-transmitting filter capable of meeting such requirement. Hence, a demand has existed for a high precision light transmitting filter.

SUMMARY OF THE INVENTION

This invention has been made in view of the above described status of the prior art and envisages to provide a method of producing the light transmitting filter by means of which the light transmitting filter having a light transmittance distribution of high accuracy can be prepared with a smaller number of process steps and in a shorter time.

To this end, the method of producing the light transmitting filter according to the present invention is characterized by the steps of forming an opaque layer of heat mode optical recording material on the surface of a transparent film base plate; modulating a laser beam with an optical modulator; and irradiating said opaque layer with the modulated laser beam for selectively evaporating desired portions of said layer for forming a pattern of light-transmitting through-holes in said layer in accordance with a preset targeted light transmittance distribution on the screen.

The light transmitting filter prepared in accordance with the present invention may be used for example in an exposure device adapted for the preparation of a phosphor screen of the high precision color cathode ray tube with high precision and fidelity.

DETAILED DESCRIPTION OF THE PREFERRED EMBODIMENT

Figure 1:
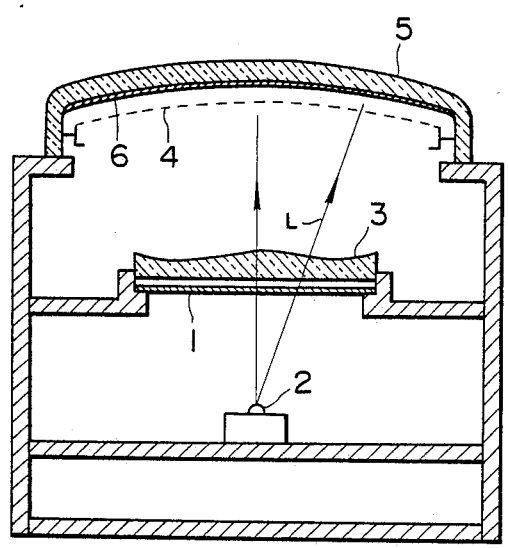
FIG. 1 is a cross-sectional view showing an exposure device adapted for the preparation of the phosphor screen of the color cathode ray tube.

In FIG. 1, there is shown an exposure device employed for instance for the preparation of a phosphor screen of a cathode ray tube. The device has a light transmitting filter 1 and a light source 2 consisting of an ultra high voltage mercury lamp provided with a forced air cooling system. A phosphor slurry 6 formed on the interior surface of a panel 5 of the cathode ray tube is exposed to the light L emitted by the light source 2 and passed through a corrective lens 3 and thereby sensitized in accordance with a pattern set by a color selective electrode 4. The phosphor slurry consists of a phosphor material dispersed into the resin of the type cured by ultraviolet rays. The phosphor slurry 6 thus exposed to the light and thereby sensitized is subjected to a developing step. The phosphorescent surface can be formed on the inner surface of the panel 5 of the cathode ray tube by repetition of the above described operation for each of the three color phosphors.

The light transmitting filter 1 is arranged below the corrective lens 3, the function of which is to cause the exposure light path to coincide with the trajectory of the electron beam. The planar light-transmitting filter 1, which is arranged in this manner between the light source 2 and the corrective lens 3, for example, has a preset pattern of light transmittance distribution in such a manner that the light transmittance is variable in different portions of the filter and the light L transmitted through the filter 1 shows a preset two-dimensional light intensity distribution characteristics. For this reason, the light transmitting filter 1 is placed within the exposure device for illuminance compensation in such a manner that the phosphor slurry is exposed at the correct positions of the dots or stripes to be formed on the phosphor screen and the dots or stripes are formed with a uniform configuration on the overall phosphor screen. It should be noted that, since the light emitted by the light source 2 is an ultraviolet light having the wavelength of, for example, 3650 Å the light transmitting filter 1 need to be fabricated of a material that is not decomposed by the ultraviolet rays.

Figure 2:
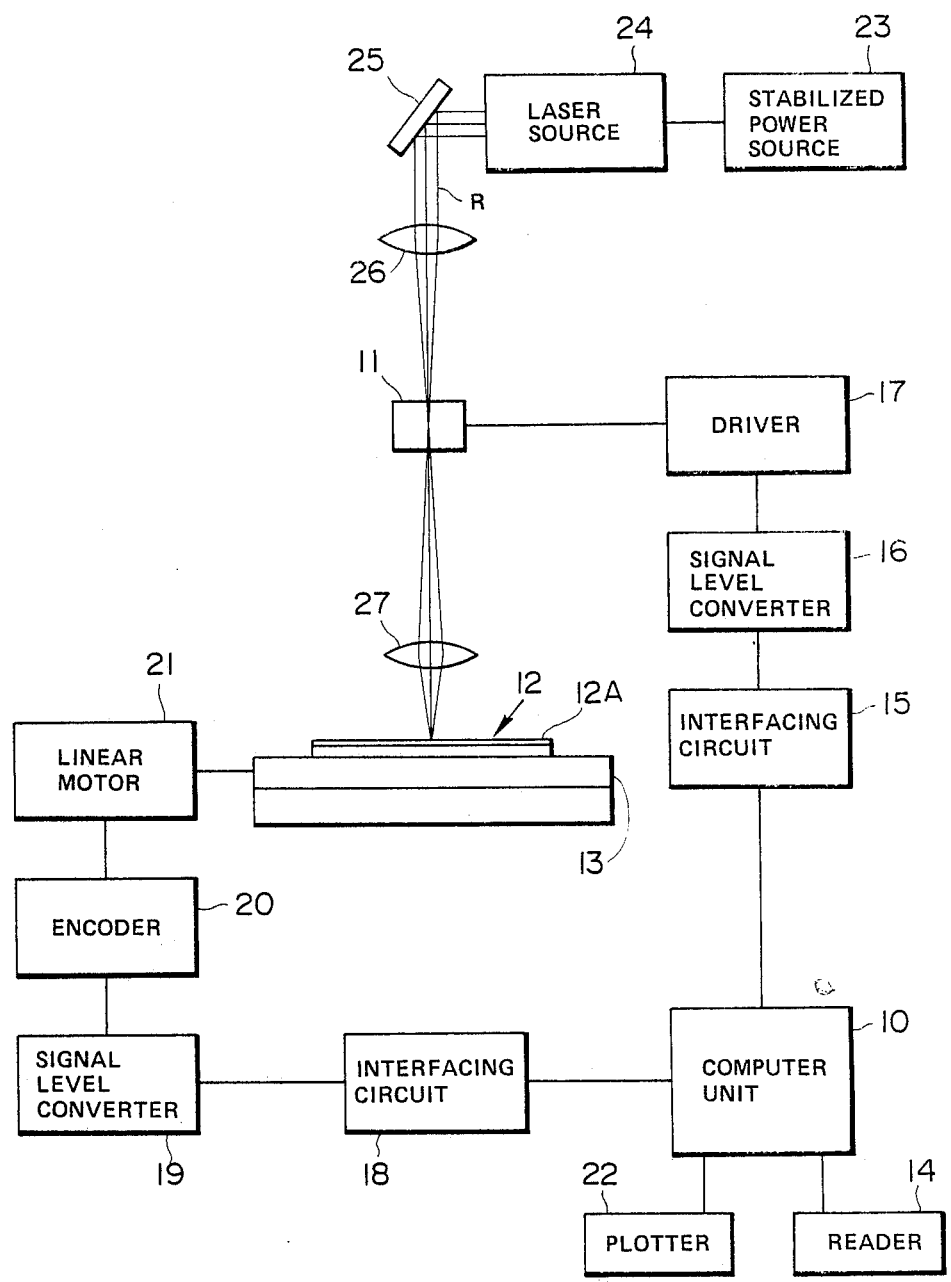
FIG. 2 is a block view showing the CAD device for executing the method according to the present invention of producing the light transmitting filter.

FIG. 2 is a block diagram of a device necessary for carrying out the process for the preparation of a light transmittive filter of the present invention. The filter prepared by this device is used for example in the above described exposure device. By the operation of the filter arranged within the exposure device, the distribution of the light volume directed to the phosphor slurry for exposure may be corrected to an optimum value so that the configuration of the phosphor dots or stripes that make up the phosphor screen of the color cathode ray tube is rendered uniform on the overall phosphor screen surface.

According to the present invention, the surface of the filter base plate on which a thin film of the heat mode optical recording medium is formed is irradiated by a laser beam for evaporating the thin film and forming a pattern of light transmitting through-holes so that a light transmitting filter with predetermined light transmittance distribution may be prepared in a shorter time and with higher accuracy. The laser beam is modulated with a light modulator under the commands of a computer unit. The filter base plate is secured to a stage 13 which is movable in the X-Y direction under the commands of the computer.

Referring to FIG. 2, there is shown a computer aided design (CAD) device adapted for the preparation of the light transmitting filter with the aid of a computer system. The stage 13 on which the light modulator 11 and the filter base plate 12 are mounted and which is movable in the X-Y direction is controlled under the commands of the computer unit 10. The signals corresponding to the desired light transmittance distribution of the light transmitting filter to be prepared are read out from a signal input device or reader 14 and entered into the computer unit 10. The output data from the computer unit 10 are supplied to an interfacing circuit 15 where they are converted into control signals which are used for controlling the light modulator 11. These control signals are then supplied to a signal level converter 16 where they are converted for example into TTL (transistor-transistor logic) level signals. The output signals from the signal level converter are supplied to a driver circuit 17 where they are converted to voltage signals capable of directly driving the light modulator 11. The output data from the computer unit 10 are also supplied to the interfacing circuit 18 where they are converted into control signals adapted for controlling the movement of the movable stage 13 in the X-direction (transverse direction) and the Y-direction (vertical direction). These control signals are then supplied to the signal level converter 19 where they are converted for example into the TTL signal level. The output signals from the signal level converter 19 are then supplied to an encoder 20 where they are encoded and translated into signals capable of driving a linear motor 21, which is thereby activated for controlling the movement of the movable stage 13 at a rate of e.g. 20 to 1000 mm/sec. The output data from the computer unit 10 are also supplied to a plotter 22 for delineating e.g. a characteristic curve showing the light transmittance distribution of the light transmitting filter now being produced by the device shown in FIG. 2.

The filter base plate 12, which is transparent and formed e.g. of glass, is securely mounted to the movable stage 13. To the overall surface of the base plate 12, there is applied a layer e.g. of tellurium (Te) to a thickness e.g. of 1000 to 1500 Å by, for example, vacuum deposition, for providing a thin layer 12A of the opaque heat mode optical recording material. It should be noted that, since the filter base plate 12 is used per se as the light transmitting filer in the exposure device shown in FIG. 1, the filter base plate is preferably fabricated of glass poorer in alkaline contents, quartz glass or acrylic resin (polymethyl methacrylate) in order that the base plate is not discolored by the ultraviolet rays in the exposure device and can be used for prolonged time.

It should be noted that an argon gas laser with e.g. a rated output of 4 watts is used as laser light source 24 to which an exciting current is supplied from a stabilized power source 23. The argon laser is highly stable and the laser output has a stability of the order of 2 percent related to the time elapsed. A crypton laser, which is equally stable, may be used instead of the argon laser. The laser beam R which is supplied from the laser source 24 and consisting of the fundamental $TEM_{00}$ mode with a uniform beam intensity distribution is reflected by a mirror 25 and condensed within the light modulator 11 by a first lens 25. The light modulator 11 makes use of acousto-optic cells (AO cells) or electrooptic cells (EO cells) and the light passing through the modulator can be deflected towards left and right by the crystal lattice of the piezo-optical crystals becoming deformed under the impressed voltage. It should be noted that the laser light R is modulated or turned on and off at a rate of $10^{-6}$ to $10^{-10}$ sec. when passing through the light modulator 11 which makes use of e.g. EO cells and to which the signal voltage is applied from the driver circuit 17. The primary mode laser beam which has passed through the light modulator 11 and which accounts for about 50 percent of the total laser beam is collected by a second lens 27, and the laser beam of the multiple longitudinal modes is radiated on the thin film 12A of the filter base plate 12. As the laser beam forms light spots on the thin film 12A of the filter base plate 12, the film is vaporized in these spots so as to give light-transmitting through-holes. The light modulator 11 is controlled by the computer unit 10 at this time, while the movable stage 13 on which the filter base plate 12 is securely mounted is moved in both the X- and Y- directions under the commands of the computer unit 10 so that a pattern of the through-holes indicative of the preset light transmittance distribution is formed on the filter base plate 12.

Figure 3A:
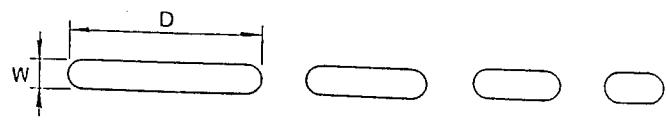
FIGS. 3 and 4 are diagrammatic views illustrating the relationship between the through-holes formed by the device On the surface of the filter base plate and pulse signals applied to the light modulator.
Figure 3B:
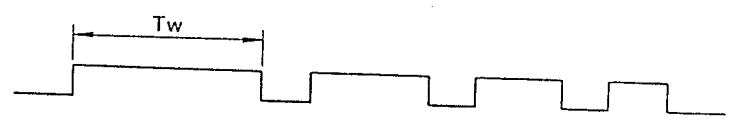
Figure 4A:
Figure 4B:
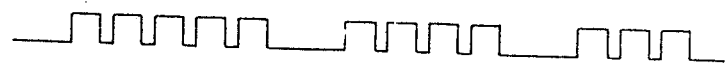

In FIGS. 3 and 4, there is shown a relationship between the through-holes formed on the filter base plate 12 and the pulse signals applied to the light modulator 11. Referring to FIG. 3, as the voltage signal shown at B is applied to the light modulator 11, the through-holes shown at A are formed on the filter base plate 12. The through-hole shown at A in FIG. 3 is constant in width W but variable in length D depending on the pulse width $T_w$ of the applied signal. It is thus seen that the preset light transmittance distribution can be afforded to the filter base plate 12 by forming a pattern of the through-holes with variable lengths D on the base plate 12.

Alternatively, the through-holes formed on the filter base plate 12 may be changed in density instead of in duration depending upon the voltage signal shown at B in FIG. 4. In this case, the diameter S of the through-holes is always the same, but the density thereof is variable on the filter base plate 12 so that the preset light transmittance distribution may also be realized with the filter base plate.

The thin film 12A obtained by vacuum deposition on the filter base plate 12 is poor in mechanical strength and susceptible to damage while it is also chemically unstable and can be oxidized easily. For this reason, a protective film for the thin layer 12A may be provided for protection, or a glass plate or the like may be affixed to the surface of the filter base plate 12 by means of an optical adhesive. In this manner, a light transmitting filter can be provided which is immune to an opto-chemical reaction and able to withstand ultra violet rays in the exposure device adapted for the preparation of the phosphor screen.

It will be appreciated from the foregoing that, according to the present invention, the surface of the filter base plate 12 on which the thin layer 12A of the heat mode optical recording material is previously formed is irradiated with a laser beam for partially and selectively vaporizing the thin layer 12A for forming a pattern of through-holes capable of providing a preset light transmittance distribution On the filter base plate. The protective coating or the like is then formed on the thin layer 12A for providing the completed light transmitting filter. Since the filter is prepared by the two steps of irradiation with laser light beam and the formation of the protective coating for the thin film, the number of the process steps can be reduced as compared to the conventional process. The light transmitting filter used for example for producing phosphor stripes at intervals of 0.2 mm on the phosphor screen can be prepared in accordance with the present invention in one to two hours, whereas five to six hours were required in the preparation of the same filter with the conventional system.

Also, in the conventional practice, in order to provide the filter with a preset light transmittance distriubtion, the intensity of the exposure light of the photographic dry plate was varied with the use of a rotary disc for providing a pattern of variable stripe widths. In accordance with the present invention, instead of changing the light intensity for changing the stripe width, the intensity of the laser light radiated to the surface of the filter base plate 12 is maintained constant and the pulse width $T_w$ of the voltage applied to the light modulator 11 is changed for changing the length D of the through-holes formed on the base plate 12.

Alternatively, the diameter D of the through-hole may be kept constant and the distribution of through-hole density as a whole may be changed by pulse number modulation for realizing the preset light transmittance distribution on the filter base plate. In this manner, the rotary plate for which a sufficient accuracy can generally not be expected is now dispensed with, and the laser light is modulated by the light modulator 11 operating accurately in response to the input signal in such a manner the length D or the density of the through-holes is changed and the desired light transmittance distribution can be accurately and faithfully reproduced on the filter base plate 12. Thus, on account of the improvement in reproducibility of the input signals, the accuracy in the light transmittance of 1 to 2% heretofore possible at the photographic developing stage can be raised to 0.3 to 0.2% in accordance with the present invention.

In the above description, tellurium (Te) is used for the formation of the layer 12A of the heat mode optical recording material. However, as an alternative, chromium (Cr) can be deposited to a thickness of 1000 to 2000 Å for the formation of the thin layer 12A. It should be noted that, should the filter base plate 12 be formed of glass, micro-sized cracks are liable to be developed in the glass due to heat stress when the metallized film is irradiated with the laser light. It is because the chromium (Cr) has a higher boiling point than tellurium (Te). Therefore the filter base plate is preferably formed of quartz glass.

It should be noted that such materials as TeCu, TeC, AsTe, TeSe, AsSeTe, TeOx (tellurium oxide), $As_2Se_3$, Se, CuPc (cupro-phthalo-cyanine), Bi or Ni may be used in place of Te and Cr for forming the opaque layer 12A of the heat mode recording material to a sub-micron size.

The results of our experiments on using the SiO vaporized film as the thin layer 12A show that the periphery of the through-holes tends to be changed into transparent $SiO_2$ and blurred in contour so that the peripheral portion need to be reshaped.

In the foregoing description, the width of the light transmitting through-holes is maintained constant and the length D thereof is changed, or alternatively, the diameter S of the through-holes is maintained constant and the density of the through-holes is generally changed. However, the desired preset light transmittance may also be achieved by changing the intensity of the laser beam or by changing the width of the light-transmitting stripes by means of an appropriate optical control system.

It is thus seen that, in accordance with the present invention, the filter base plate on which the thin layer of the heat mode recording material has been formed is irradiated with a laser beam modulated with the light modulator so that the thin layer is vaporized partially for forming the light transmitting through-holes, and thus the light transmitting filter having a desired light transmittance pattern of light-transmitting through-holes may be formed accurately in a shorter time by controlling the movement in the X- and Y- directions of the movable stage carrying the filter base plate.

We claim:
1. A method of producing a selective light transmitting filter for illuminance correction purposes in an exposure device adaptive for producing a phosphor screen of a cathode ray tube, comprising the steps of:
    forming an opaque layer of heat mode optical recording material on a flat transparent base plate;

modulating a laser beam by an optical modulator operated by voltage pulses a pulse width or period of repetition of which is preset by the pattern to be formed in said layer; and irradiating and applying said pulses of said modulated laser beam on said layer while moving said beam plate in perpendicular directions in the same plane for evaporating selected desired portions of said layer to produce a predetermined, varying pattern of light transmitting through-holes in said layer on said base plate in accordance with said predetermined light transmittance pattern.

2. The method according to claim 1, in which said base plate is a glass plate.

3. The method according to claim 1, in which said base plate is a quartz plate.

4. The method according to claim 1, in which said base plate is an acrylic resin plate.

5. The method according to claim 1, in which said layer is formed of tellurium (Te).

6. The method according to claim 1, in which said layer is formed of chromium (Cr).

7. The method according to claim 1, in which said layer is selected from the group of TeCu, TeC, AsTe, AsSeTe, TeOx, Bi, Ni and TeSe.

8. The method according to claim 1, in which the intensity of said laser beam is constant and the pulse width of the voltage applied to said optical modulator is changed so that the length of said light-transmitting through-hole is changed.

9. The method according to claim 1, in which the diameter of said light-transmitting through-hole is constant and the number of the pulses applied to said optical modulator is changed so that the density distribution of said through-hole is changed.

* * * * *